(12) United States Patent
Pardee

(10) Patent No.: US 7,527,134 B2
(45) Date of Patent: May 5, 2009

(54) ROTATIONAL COUPLING DEVICE

(75) Inventor: James A. Pardee, Glen Ellyn, IL (US)

(73) Assignee: Warner Electric Technology LLC, Braintree, MA (US)

( * ) Notice: Subject to any disclaimer, the term of this patent is extended or adjusted under 35 U.S.C. 154(b) by 335 days.

(21) Appl. No.: 11/278,448

(22) Filed: Apr. 3, 2006

(65) Prior Publication Data

US 2007/0227853 A1  Oct. 4, 2007

(51) Int. Cl.
*F16D 27/112*  (2006.01)
*F16D 67/06*  (2006.01)

(52) U.S. Cl. .............. 192/84.961; 192/18 B; 192/115

(58) Field of Classification Search ......... 192/18 B, 192/84.961
See application file for complete search history.

(56) References Cited

U.S. PATENT DOCUMENTS

| | | | |
|---|---|---|---|
| 2,481,028 A | 9/1949 | Lear | |
| 2,659,830 A | 11/1953 | Mason et al. | |
| 2,962,139 A * | 11/1960 | Straub | 192/18 B |
| 2,962,142 A * | 11/1960 | Straub | 192/84.2 |
| 3,381,784 A * | 5/1968 | Miller et al. | 192/18 B |
| 3,552,533 A | 1/1971 | Nitz | |
| 3,639,197 A | 2/1972 | Spain | |
| 3,677,377 A | 7/1972 | Miller | |
| 3,679,034 A | 7/1972 | Miller | |
| 3,712,428 A | 1/1973 | Maria | |
| 3,724,619 A | 4/1973 | Miller | |
| 3,789,966 A | 2/1974 | Miller | |
| 3,893,191 A | 7/1975 | Gold et al. | |
| 3,934,686 A | 1/1976 | Stimson et al. | |
| 3,945,476 A | 3/1976 | de Jong | |
| 3,994,379 A | 11/1976 | Miller et al. | |
| 4,030,583 A | 6/1977 | Miller | |
| 4,387,794 A | 6/1983 | Schneider et al. | |
| 4,496,922 A | 1/1985 | Pardee | |
| 4,556,132 A | 12/1985 | Lengsfeld et al. | |
| 4,643,282 A | 2/1987 | Edl | |
| 4,709,794 A | 12/1987 | Lengsfeld et al. | |

(Continued)

FOREIGN PATENT DOCUMENTS

DE  2110609  10/1972

(Continued)

OTHER PUBLICATIONS

English Language Abstract for DE 3212305.

(Continued)

*Primary Examiner*—Richard M. Lorence
(74) *Attorney, Agent, or Firm*—Dykema Gossett PLLC

(57) ABSTRACT

A rotational coupling device for use as a clutch and/or brake is provided having a construction enabling improved torque transfer characteristics. The device includes a rotor rotatably coupled to an input shaft and an armature coupled to an output member and configured for selective engagement with the rotor. The rotor includes a hub having a central bore into which the input shaft extends. A support member, such as a spacer or pulley hub is coupled to the rotor hub using an axially projecting lug and notch construction. The structure of the device provides greater clearance for the input shaft and may eliminate the need for keys on the support member.

20 Claims, 4 Drawing Sheets

U.S. PATENT DOCUMENTS

| | | |
|---|---|---|
| 5,033,595 A | 7/1991 | Pardee |
| 5,119,918 A | 6/1992 | Pardee |
| 5,285,882 A | 2/1994 | Pardee |
| 5,305,865 A | 4/1994 | Larson et al. |
| 5,465,820 A | 11/1995 | Dick |
| 5,549,186 A | 8/1996 | Pardee |
| 5,609,232 A | 3/1997 | Brownfield et al. |
| 5,971,121 A | 10/1999 | Pardee |
| 6,827,189 B2 | 12/2004 | Schneider et al. |

FOREIGN PATENT DOCUMENTS

| | | |
|---|---|---|
| DE | 3212305 | 10/1983 |
| FR | 2405586 | 5/1979 |
| GB | 1586180 | 3/1981 |

OTHER PUBLICATIONS

International Search Report issued in counterpart International (PCT) Application No. PCT/US2007/008252 (Aug. 25, 2008).

Written Opinion issued in counterpart International (PCT) Application No. PCT/US2007/0082552 (Aug. 25, 2008).

\* cited by examiner

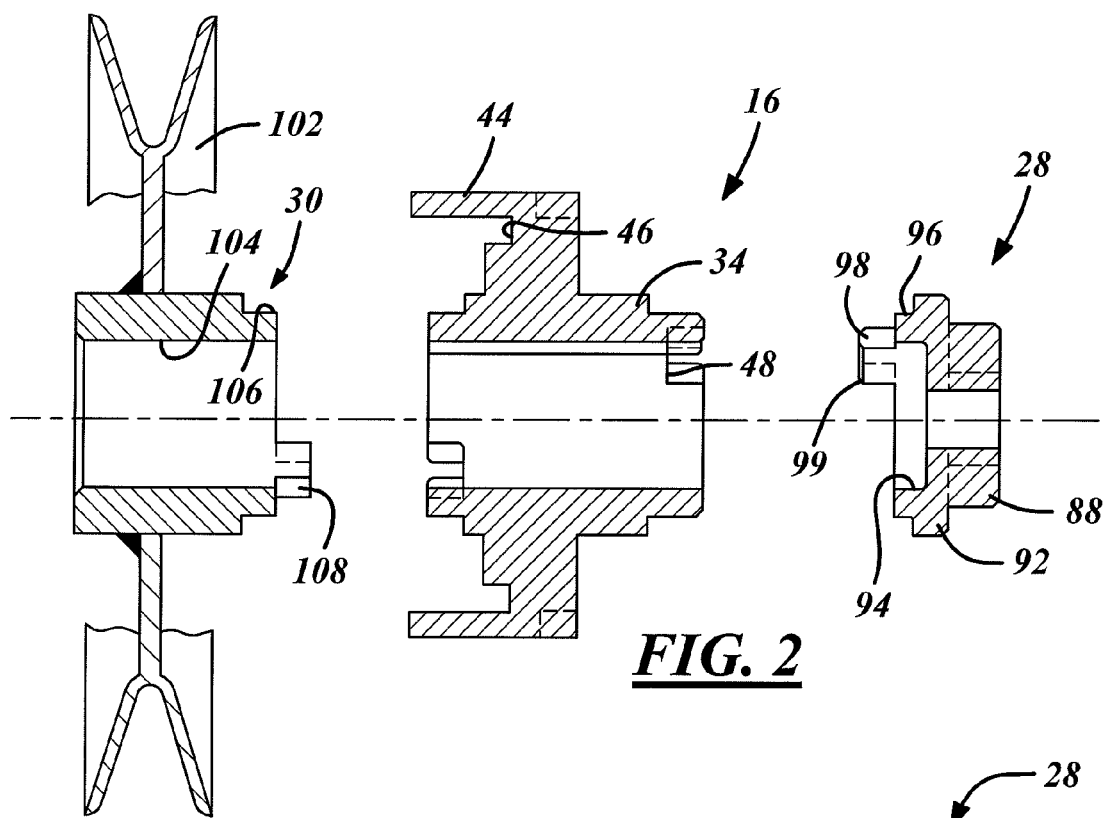
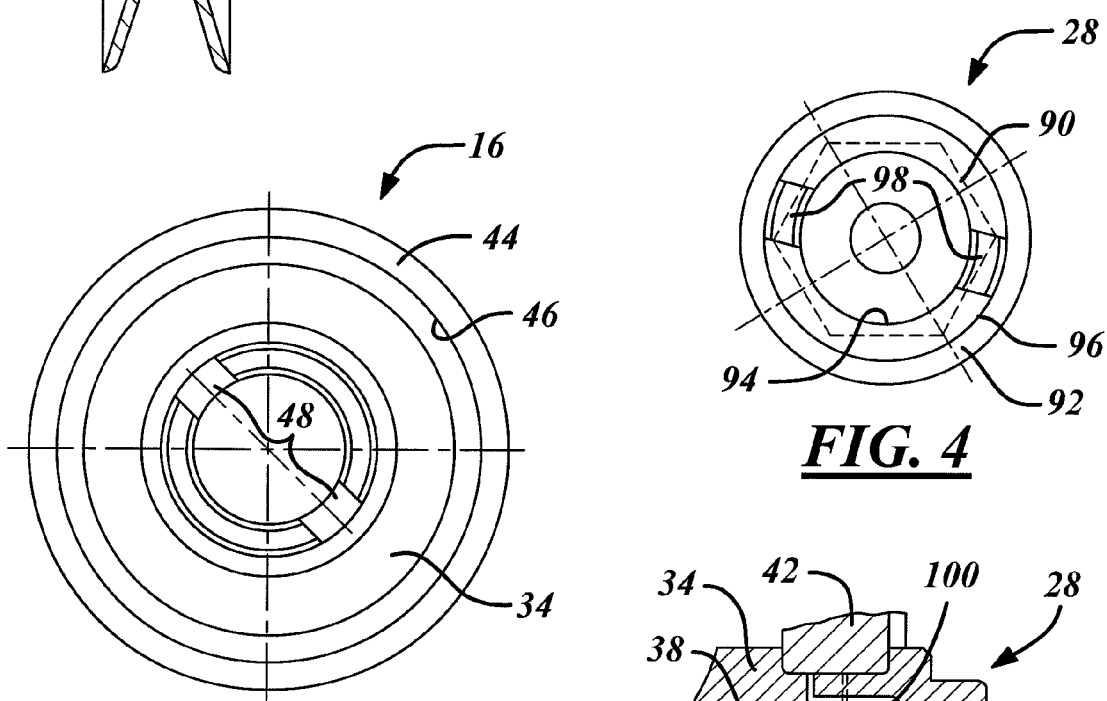
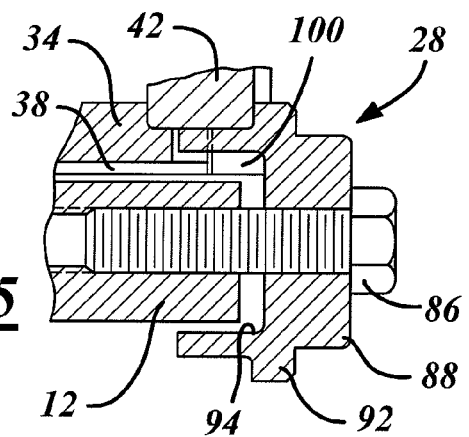

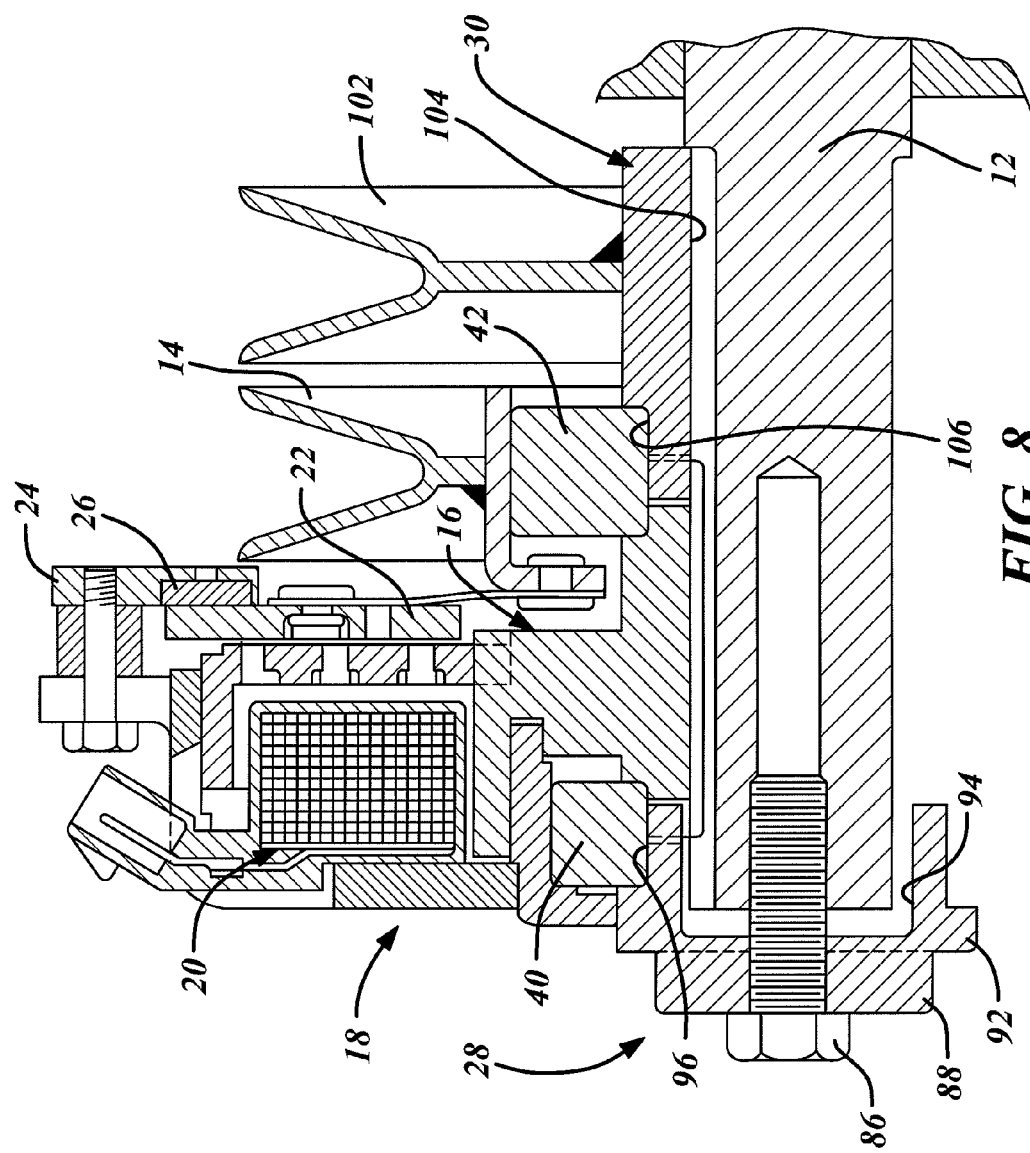
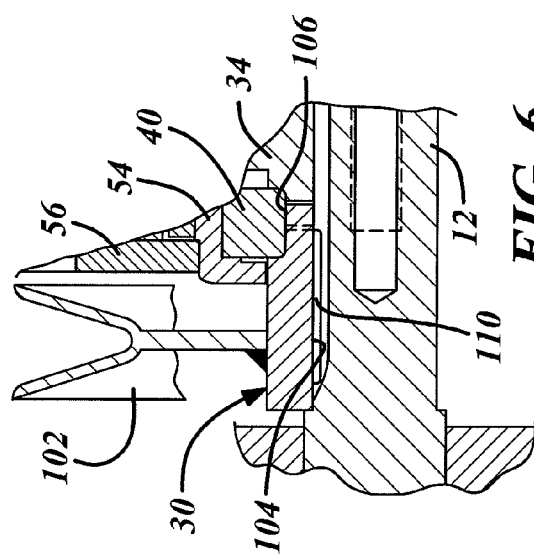
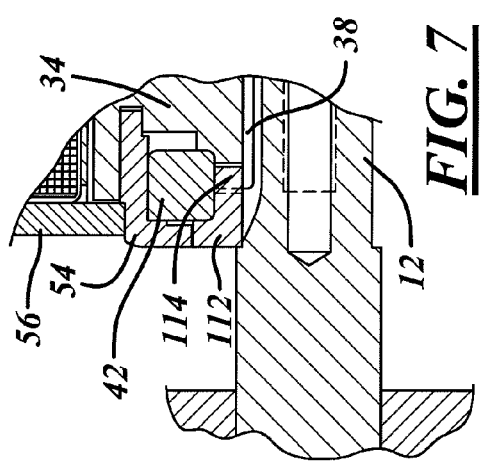

ROTATIONAL COUPLING DEVICE

BACKGROUND OF THE INVENTION

1. Field of the Invention

This invention relates to rotational coupling devices such as brakes and clutches and, in particular, to a rotational coupling device that provides enhanced torque transfer characteristics through an inventive coupling arrangements of components within the device.

2. Discussion of Related Art

Rotational coupling devices such as clutches and brakes are used to control transfer of torque between rotational bodies. One type of conventional device is illustrated in U.S. Pat. Nos. 5,119,918, 5,285,882 and 5,971,121, the entire disclosures of which are incorporated herein by reference. This device includes a rotor that is coupled to an input shaft for rotation with the input shaft about a rotational axis. A field shell is also disposed about the input shaft on one side of the rotor and is fixed against rotation. The field shell defines radially spaced, axially extending inner and outer poles between which an electrical conductor is disposed, facing the rotor. A brake plate is coupled to the field shell and axially spaced from the field shell. The brake plate is disposed on a side of the rotor opposite the conductor. An armature coupled to an output member is disposed on the same side of the rotor as the brake plate and is disposed axially between the rotor and the brake plate. The armature is coupled to an output member by a plurality of leaf springs. Energizing the conductor produces a magnetic circuit in the field shell, rotor and armature that draws the armature into engagement with the rotor and couples the input shaft and output member together for rotation. Upon deenergization of the conductor, the leaf springs draw the armature out of engagement with the rotor and into engagement with the brake plate to brake the armature and output member. Permanent magnets coupled to the brake plate are also used to create another magnetic circuit between the brake plate, the field shell and the armature to assist the leaf springs in braking the armature and output member.

The above described devices generally perform well. Conventional rotational coupling devices have several disadvantages, however. Support members such as spacers used to hold the components of the device in assembled relation limit clearance for the input shaft thereby reducing the amount of engagement between the input shaft and device components and reducing torque transfer. Further, conventional support members are often coupled to the input shaft or other through a key/keyway arrangement. Although this arrangements is satisfactory for its intended purpose, it requires precise alignment with the key/keyway of the rotor.

The inventors herein have recognized a need for a rotational coupling device that will minimize and/or eliminate one or more of the above-identified deficiencies.

SUMMARY OF THE INVENTION

The present invention provides a rotational coupling device.

A rotational coupling device in accordance with the present invention includes a rotor coupled to an input shaft for rotation therewith. The input shaft is disposed about a rotational axis. The rotor has a hub defining a central bore into which the input shaft extends. The device also includes an armature disposed about the axis. The armature is coupled to an output member and configured for selective engagement with the rotor. The device further includes a support member disposed about the axis. One of the hub and the support member defines a notch disposed in a first axial end face of the one of the hub and the support member. Another of the hub and the support member defines an axially projecting lug on a first axial end of the another of the hub and the support member configured to be received within the notch thereby rotatably coupling the support member and the rotor.

A rotational coupling device in accordance with the present invention represents an improvement over conventional devices. By coupling support members such as spacers or pulley hubs to the rotor in an axial direction, the inventive device enables greater clearance for the input shaft. As a result, more of the shaft can be coupled to the rotor for increased torque transfer and the clutch can be used in a greater variety of applications. Further, coupling in the axial direction may eliminate the need for a key/keyway connection for the support components and the need for precise alignment with the rotor key.

These and other advantages of this invention will become apparent to one skilled in the art from the following detailed description and the accompanying drawings illustrating features of this invention by way of example.

BRIEF DESCRIPTION OF THE DRAWINGS

FIG. 2 is an exploded cross-sectional view of several components of the rotational coupling device of FIG. 1.

FIG. 3 is a plan view of one of the components of the rotational coupling device of FIG. 1.

FIG. 4 is a plan view of another one of the components of the rotational coupling device of FIG. 1.

FIG. 5 is an enlarged cross-sectional view of a portion of a rotational coupling device in accordance with another embodiment of the present invention.

FIG. 6 is an enlarged cross-sectional view of a portion of a rotational coupling device in accordance with another embodiment of the present invention.

FIG. 7 is an enlarged cross-sectional view of a portion of a rotational coupling device in accordance with another embodiment of the present invention.

FIG. 8 is a partial cross-sectional view of a rotational coupling device in accordance with another embodiment of the present invention.

DETAILED DESCRIPTION OF EMBODIMENTS OF THE INVENTION

Figure 1:
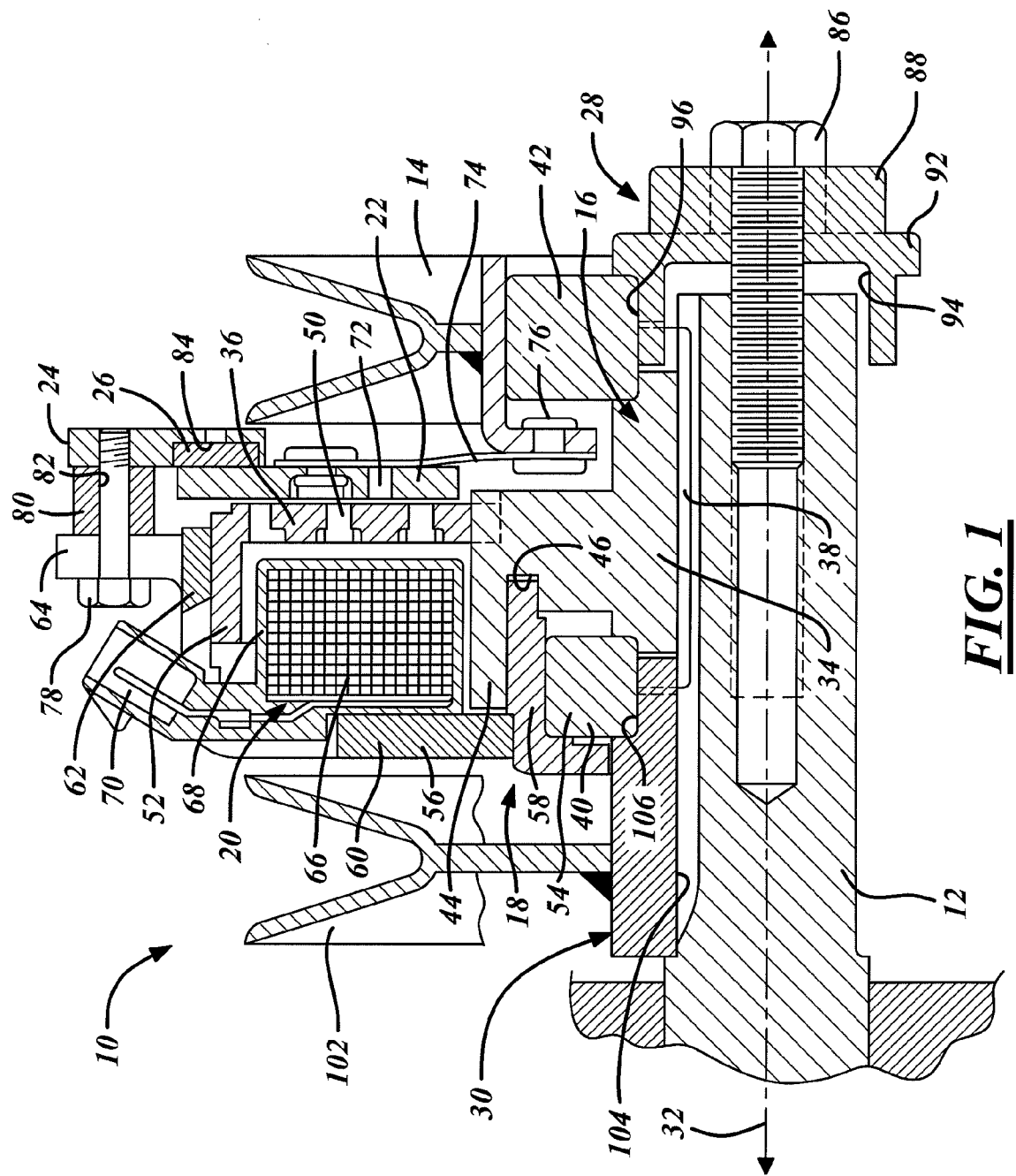
FIG. 1 is a partial cross-sectional view of a rotational coupling device in accordance with one embodiment of the present invention.

Referring now to the drawings wherein like reference numerals are used to identify identical components in the various views, FIG. 1 illustrates a rotational coupling device 10 in accordance with one embodiment of the present invention. Device 10 functions as a clutch to selectively transfer torque from an input shaft 12 to an output member 14. Device 10 also functions as a brake on output member 14 when torque is not being transferred to output member 14. Device 10 may be provided for use in a riding lawnmower or similar device. It will be understood by those of ordinary skill in the art, however, that device 10 may be used in a wide variety of applications requiring a clutch or brake. Device 10 may include a rotor 16, a field shell 18, an electrical conduction assembly 20, an armature 22, a brake pole 24, one or more permanent magnets 26 and one or more support members such as spacer 28 or pulley hub 30.

Input shaft 12 provides a source of torque for driving output member 14. Shaft 12 may be made from conventional metals and metal alloys and may be solid or tubular. Shaft 12 is centered about a rotational axis 32 and is driven by an engine, electric motor or other conventional power source. In the illustrated embodiment input shaft 12 is inserted into device 10 on a side of device 10 opposite output member 14.

Output member 14 transfers torque to a driven device such as a lawnmower blade. Member 14 may comprise a conventional pulley around which a torque transmitting belt is wound and coupled to the driven device.

Rotor 16 is provided for selective engagement with armature 22 to transmit torque between input shaft 12 and output member 14. Rotor 16 is disposed about axis 32 and is coupled to input shaft 12 for rotation therewith. Rotor 16 may be made from conventional metals and metal alloys and includes a hub 34 and a rotor disc 36.

Hub 34 is tubular and defines a central bore into which input shaft 12 extends. Hub 34 includes a radially inwardly extending key 38 configured to be received within the keyway of input shaft 12. At either axial end, hub 34 abuts against and supports bearings 40, 42. At its radially outer diameter, hub 34 defines an axially extending inner rotor pole 44. Hub 34 further defines an axially extending recess 46 radially inwardly of pole 44 for a purpose described hereinbelow. Referring to FIG. 2, in accordance with the present invention, hub 34 may include one or more notches 48 disposed in either axial end face of hub 34 for a purpose discussed hereinbelow. Referring to FIG. 3, hub 34 may include a pair of notches 48 in either end face diametrically opposite one another. If should be understood, however, that the number, shape and orientation of notches 48 may vary without departing from the spirit of the present invention. Further, and with reference to FIG. 1, although the notches 48 on opposite end faces of hub 34 may be in line, or in phase, with one another, the notches 48 may also be phase shifted to allow for improved manufacturing of hub 34 (e.g. each end face may include diametrically opposite notches 48 with the notches 48 on one end face phase shifted by 90 degrees relative to the notches 48 on the opposite end face).

Disc 36 extends radially outwardly from hub 34. Disc 36 is coupled to hub 34 through, for example, a press-fit relationship including plurality of complementary lugs and notches. As is known in the art, disc 36 may include a plurality of radially spaced rows of angularly spaced, banana shaped slots 50. Upon energization of conduction assembly 20, slots 50 cause magnetic flux to travel back and forth between disc 36 and armature 22 across an air gap enabling a high torque engagement between rotor 16 and armature 22. In the illustrated embodiment, disc 36 includes three rows of slots 50. It should be understood, however, that the number of rows of slots 50 the number of slots 50 in any one row, and the size and shape of slots 50 may vary. At its outer diameter, disc 36 defines an axially extending outer rotor pole 52. Pole 52 is radially aligned with pole 44 and spaced radially outwardly of pole 44.

Field shell 18 is provided to house conduction assembly 20. Shell 18 also forms part of a magnetic circuit that causes the selective engagement of rotor 16 and armature 22. Field shell 18 may be made from conventional metals and metal alloys, including steel. Shell 18 is cylindrical and is disposed about axis 32 and is supported on an outer race of bearing 40. Shell 18 is fixed against rotation through, for example, a fastener (not shown) extending through a slot (not shown) in shell 18. Shell 18 is generally U-shaped in cross-section and includes radially inner and radially outer annular members 54, 56.

Inner member 54 is supported on an outer race of bearing 40. Member 54 is generally L-shaped in cross-section and defines an axially extending inner pole 58. Pole 58 extends into recess 46 of hub 34 of rotor 16 and is therefore disposed radially inwardly of inner rotor pole 44. As described more fully in commonly assigned and copending U.S. patent application Ser. No. 11/150,671, the entire disclosure of which is incorporated herein by reference, the relative location of poles 44, 58 is advantageous for several reasons. First, the magnetic efficiency of the magnetic circuit involving rotor 16, field shell 18 and armature 22 is improved by reducing the number of air gaps for at least some of the magnetic flux in the circuit. Second, the annular gap in which conduction assembly 20 is disposed is enlarged enabling easier insertion and fastening of assembly 20 within field shell 18.

Outer member 56 is coupled to and supported on inner member 54. Outer member 56 defines an end wall 60, an axially extending outer pole 62, and a flange 64. End wall 60 extends radially outwardly from member 54. Pole 62 is integral with, and extends axially from, end wall 60. Pole 62 is disposed radially outwardly of pole 52 of rotor 16. Flange 64 is integral with, and extends radially outwardly from, pole 62 at an end of pole 62 opposite end wall 60. Flange 64 extends along at least a portion of the circumference of pole 62.

Conduction assembly 20 is provided to create a magnetic circuit among rotor 16, field shell 18, and armature 22 to cause movement of armature 22 into engagement with rotor 16 and transmission of torque from input shaft 12 to output member 14. Conduction assembly 20 is generally annular and is disposed about axis 32 within field shell 18. In particular, assembly 20 is disposed between the inner and outer poles 58, 62 of shell 18. Assembly 20 includes a conductor 66 and a shell 68.

Conductor 66 may comprise a conventional copper coil although other known conductors may alternatively be used. Conductor 66 may be connected electrically to a power supply (not shown) such as a battery. Upon energization of conductor 66, a magnetic circuit is formed between rotor 16, field shell 18, and armature 22. Magnetic flux flows from outer pole 62 of shell 18 across an air gap to outer pole 52 of rotor 16. Flux then travels back and forth between disc 36 and armature 22 across the air gap between them. Flux then flows from disc 36 of rotor 16 to hub 34 of rotor 16. Finally, flux flows from hub 34 back to members 54, 56 of field shell 18 along several paths. In particular, a portion of the flux flows directly from inner rotor pole 44 to member 56. Another portion of the flux flows from hub 34 through inner pole 58 of member 54 before flowing to member 56. Still another portion of the flux may flow from hub 34 to pulley hub 30 radially inwardly of bearing 40 and then to member 54 and member 56 allowing a portion of the flux to avoid the high density area of inner rotor pole 44 and inner field shell pole 58 and further improving the magnetic efficiency of the circuit.

Shell 68 is provided to house conductor 66 and is also used to mount conductor 66 within field shell 18. Shell 68 may be molded from conventional plastics. Shell 68 may include an integral terminal connector 70 through which conductor 66 may be electrically connected to a power source. Shell 68 may also define one or more lugs (not shown) sized to be received within recesses in end wall 60 of field shell 18 to prevent rotation of conduction assembly 20. Shell 68 may include a radially outwardly extending flange (not shown) disposed proximate outer pole 62 of field shell 18 and affixed to shell 18 at a plurality of points as described in commonly assigned pending U.S. patent application Ser. No. 11/150,670, the entire disclosure of which is incorporated herein by reference.

Armature 22 is provided to transmit a braking torque to output member 14 and to selectively transmit a drive torque from rotor 16 to output member 14. Armature 22 may be made form a variety of conventional metals and metal alloys including steel. Armature 22 is annular in construction and disposed about axis 32. Armature 22 is axially spaced from rotor 16 by an air gap. Like rotor disc 36, armature 22 includes a plurality of radially spaced rows of angularly spaced slots 72 that facilitate travel of magnetic flux back and forth between rotor 16 and armature 22 upon energization of conduction assembly 20. In the illustrated embodiment, armature 22 includes two rows of slots 72. It should be understood that the number of rows of slots 72 on armature 22, the number of slots 72 in any one row, and the size and shape of slots 72 may vary. Armature 22 is coupled to output member 14. In particular, armature 22 may be coupled to output member 14 by a plurality of leaf springs 74. Springs 74 transmit drive and braking torque from armature 22 to output member 14 and allow for axial movement of armature 22 relative to member 14 and towards and away from rotor disc 36. Springs 74 may be made from stainless steel and are connected at one end to armature 22 and at an opposite end to output member 14 using conventional fasteners 76 such as rivets, screws, bolts, or pins.

Brake pole 24 provides a braking surface for engagement by armature 22 to brake output member 14. Pole 24 further forms part of a magnetic circuit with armature 22 and magnets 26 and may provide a means for housing magnet 26. Brake pole 24 may be made from conventional materials having a relatively low magnetic reluctance including conventional metals and metal alloys such as steel. Brake pole 24 extends about at least a portion of the circumference of device 10 and is coupled to field shell 18. In particular, brake pole 24 is coupled to flange 64 of field shell 18 using one or more fasteners 78. Fasteners 78 may be made from non-magnetic materials or materials having a relatively high magnetic reluctance to reduce or eliminate flux transfer between brake pole 24 and field shell 18 and thereby facilitate clutch engagement when conduction assembly 20 is energized. Brake pole 24 may be axially spaced from flange 64 of field shell 18 using one or more spacers 80. Spacers 80 may include bores 82 through which fasteners 78 extend. Spacers 80 may likewise be made from non-magnetic materials or materials having a relatively high magnetic reluctance to reduce or eliminate flux transfer between brake pole 24 and field shell 18.

Magnets 26 are provided to create a magnetic circuit between brake pole 24 and armature 22 to draw armature 22 into engagement with brake pole 24 and provide a braking torque to output member 14. Magnets 26 may comprise neodymium iron boron (Nd—Fe—B) magnets or other known permanent magnets. Magnets 26 are axially aligned with a portion of armature 22 thereby reducing the number of air gaps in the magnetic circuit relative to conventional coupling devices and improving magnetic efficiency, as described in greater detail in commonly assigned copending U.S. patent application Ser. No. 11/150,027, the entire disclosure of which is incorporated herein by reference. Magnets 26 may be oriented such that magnetic flux travels throughout magnets 26 in an axial, radial, or arcuate (circumferential) direction. Magnets 26 may be received within pockets 84 formed in brake pole 24. Alternatively, magnets 26 may instead be received within a pocket formed in armature 22 and axially aligned with brake pole 24. Magnets 26 may be arranged such that one face of each magnet 26 is flush with one side (and the braking surface) of brake pole 24 (or armature 22). By placing magnets 26 such that one face is flush with the braking surface of brake pole 24 (or armature 22), magnets 26 add to the wear surface of brake pole 24 (or armature 22) increasing its wear resistance and the braking surface.

Figure 10:
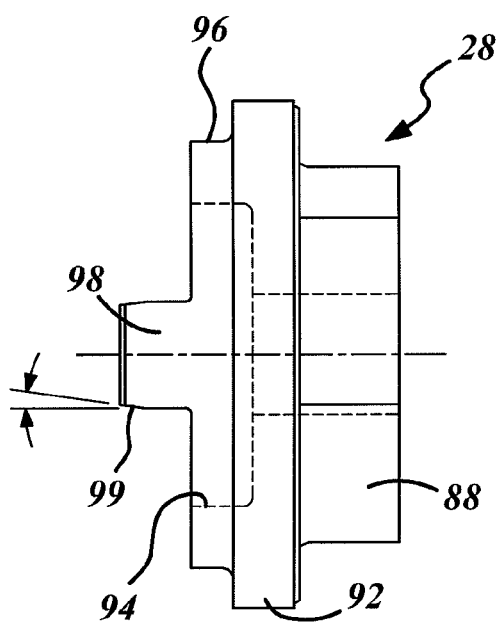
FIG. 10 is a plan view of one of the components of the rotational coupling device of FIG. 1.

Spacer 28 is provided to support output member 14 in assembled relation with the other components of device 10 and may be made from conventional materials including powdered metals. Spacer 28 is disposed about axis 32 and is generally cylindrical in shape. Spacer 28 is configured to receive a fastener 86 that extends through spacer 28 and into input shaft 12. Spacer 28 may define a head 88 at one axial end having a plurality of flats 90 (best seen in FIG. 4) that allow input shaft 12 to be secured while applying torque to fastener 86. Spacer 28 may further define a body 92 extending axially from head 88. Body 92 defines a central bore 94 configured to receive input shaft 12 and has a generally cylindrical outer surface 96 on which bearing 42 may be supported between opposed shoulders on rotor hub 34 and spacer 28. Referring to FIG. 2, in accordance with the present invention spacer 28 defines one or more axially projecting lugs 98 extending from one axial end of body 92 of spacer 28. Lugs 98 are configured to be received within notches 48 in rotor hub 34 to rotatably couple spacer 28 and rotor hub 34. Lugs 98 may be tapered (as illustrated by tapered section 99 of lug 98 in FIG. 10) and may be press fit within notches 48. Referring to FIG. 4, spacer 28 may include two diametrically opposite lugs 98. It should be understood, however, that the number, shape and orientation of lugs 98 may vary without departing from the spirit of the present invention.

The use of axially projecting lugs 98 in spacer 28 and corresponding notches 48 in hub 34 to couple spacer 28 and hub 34 in device 10 represents a significant improvement relative to conventional rotational coupling devices. Because spacer 28 is not coupled to hub 34 through key 38, the central bore 94 of body 92 of spacer 28 may be sized to receive input shaft 12 thereby providing increased clearance for input shaft 12 and greater contact between shaft 12 and rotor 16 resulting in improved torque transfer characteristics and enabling the clutch to be used in a greater variety of applications. Referring to FIG. 5, in another embodiment of the invention, spacer 28 may further include a radially inwardly extending key 100 configured to be received within the keyway in input shaft 12 (and aligned with key 38 in rotor hub 34) to increase torque capacity.

Referring again to FIG. 1, pulley hub 30 is provided to support a drive pulley 102 that may be used to provide a constant driving torque (as opposed to the selective torque provided by output member 14) for various purposes depending on the application of device 10. Hub 30 may be made from conventional metals and metal alloys. Hub 30 is generally cylindrical in shape and defines a central bore 104 configured to receive input shaft 12. Hub 30 defines a cylindrical outer surface 106 configured to support bearing 40 which may be captured between opposed shoulders in hub 30 and rotor hub 34. Hub 30 may also provide a path for transmission of flux between rotor hub 34 and member 54 of field shell 18. Referring to FIG. 2, in accordance with the present invention hub 30 may include one or more axially projecting lugs 108 configured to be received within corresponding notches 48 in rotor hub 34 to rotatably couple hubs 30, 34. Lugs 108 may be tapered and may be press fit within notches 48. As with spacer 28, hub 30 may include two diametrically opposed lugs 108, but the number, shape and orientation of lugs 108 may vary.

The use of axially projecting lugs 108 in pulley hub 30 and corresponding notches 48 in hub 34 to couple hubs 30, 34 in device 10 represents another significant improvement relative to conventional rotational coupling devices. Because hub 30 is coupled to rotor hub 34 through lugs 108, hub 30 does not need to be directly coupled to input shaft 12 and does not require a corresponding key. As a result, the need for precise alignment of hub 30 with rotor hub 34 is eliminated.

Referring to FIG. 6, in an alternative embodiment of the invention, hub 30 may nevertheless include a radially inwardly extending key 110 in addition to, or (as illustrated in FIG. 6) as an alternative to, the key 38 in hub 34. As a result, hub 30 may either share the torque load with rotor hub 34 or be used to drive rotor hub 34 eliminating the need for key 38 in rotor hub 34.

Referring now to FIG. 7, in accordance with another embodiment of the present invention, pulley 30 may be eliminated and another support member, such as spacer 112, with corresponding lugs 114 may be substituted for hub 30. Lugs 114 may again be tapered and press fit within notches 48. As with spacer 28 and pulley 30, spacer 112 may include a pair of diametrically opposed lugs 114, but the number, shape and orientation of lugs 114 may vary.

Referring now to FIG. 8, in accordance with another embodiment of the present invention, the orientation of various components of device 10 may be reversed. In particular, device 10 may be mounted to input shaft 12 with field shell 18 located proximate the outboard end of input shaft 12 rather than output member 14. In this arrangement, the locations of spacer 28 and pulley hub 30 may be reversed relative to the other components of device 10 such that spacer 28 is disposed inwardly of field shell 18 and supports bearing 40 while pulley hub 30 is disposed proximate output member 14 and supports bearing 42.

Figure 9:
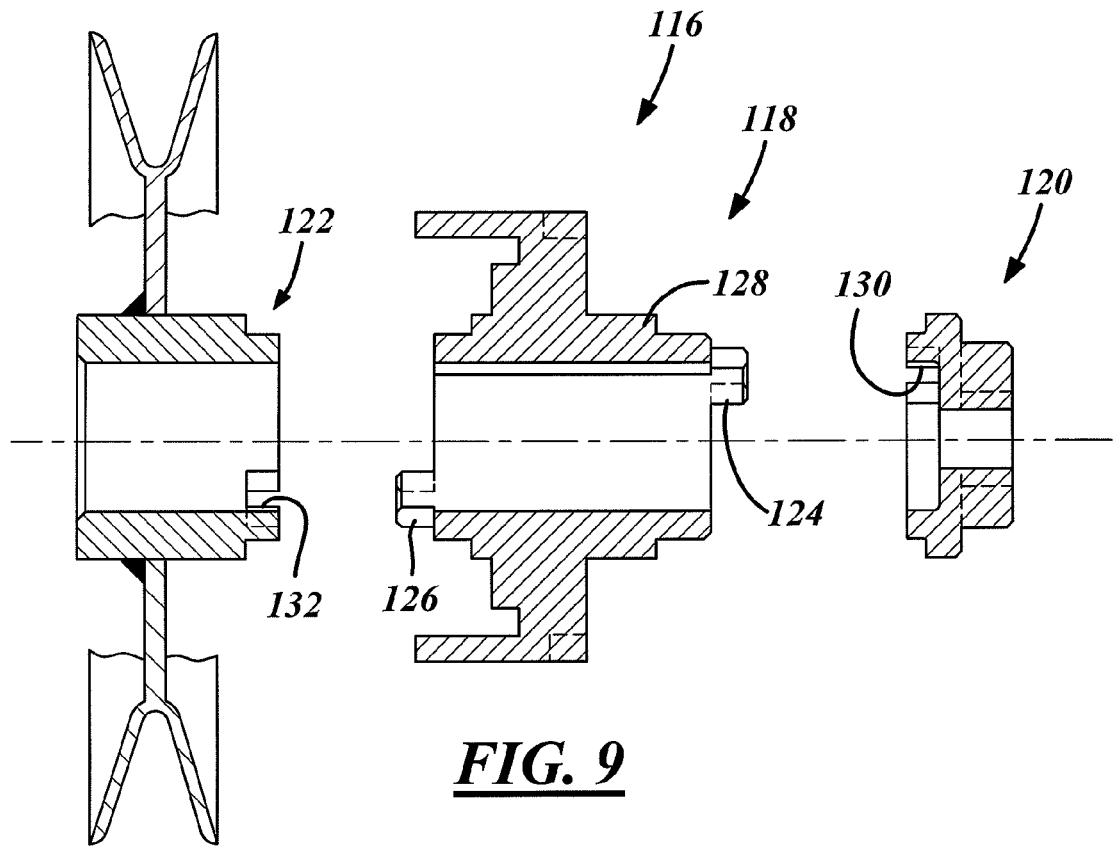
FIG. 9 is an exploded cross-sectional view of several components of a rotational coupling device in accordance with another embodiment of the present invention.

While the invention has been shown and described with reference to one or more particular embodiments thereof, it will be understood by those of skill in the art that various changes and modifications can be made without departing from the spirit and scope of the invention. For example, referring to FIG. 9, in accordance with another embodiment of the invention, the placement of the lugs and notches on the rotor hub and any or all of the support members may be reversed. As shown in FIG. 9, a device 116 may include a rotor 118, spacer 120 and pulley hub 122. Rotor 118, spacer 120 and pulley hub 122 are generally similar to rotor 16, spacer 28 and pulley hub 30 described hereinabove, but with the relative positions of the notches and lugs reversed. Accordingly, rotor 118 defines axially projecting lugs 124, 126 on either axial end of hub 128 which may be similar to lugs 98, 108 described hereinabove. Spacer 120 and pulley hub 122 define notches 130, 132, respectively, in axial end faces of spacer 120 and pulley hub 122 which may be similar to notches 48 described hereinabove. The size, shape and orientation of lugs 124, 126 and notches 130, 132 may be varied as described hereinabove with reference to lugs 98, 108 and notches 48.

I claim:

1. A rotational coupling device, comprising:
a rotor coupled to an input shaft for rotation therewith, said input shaft disposed about a rotational axis and said rotor having a hub defining a central bore into which said input shaft extends;
an armature disposed about said axis, said armature coupled to an output member and configured for selective engagement with said rotor; and,
a first support member disposed about said axis
wherein at least one of said hub and said first support member defines one of a key and a keyway in a radially inner surface configured for engagement with the other of said key and said keyway in a radially outer surface of said input shaft and one of said hub and said first support member defines a first notch disposed in a first axial end face of said one of said hub and said first support member and another of said hub and said first support member defines a first axially projecting lug on a first axial end of said another of said hub and said first support member configured to be received within said first notch thereby rotatably coupling said first support member and said rotor, said first notch and said first lug located further radially from said axis than said key and said keyway.

2. The rotational coupling device of claim 1 wherein said first support member comprises a spacer, said spacer fastened to said input shaft.

3. The rotational coupling device of claim 1 wherein said first support member comprises a hub, said hub supporting a pulley.

4. The rotational coupling device of claim 1 wherein a radially outer surface of said first support member supports a bearing.

5. The rotational coupling device of claim 1 wherein said one of said hub and said first support member defines a second notch disposed in said first axial end face of said one of said hub and said first support member and said another of said hub and said first support member has a second axially projecting lug on said first axial end of said another of said hub and said first support member, said second axially projecting lug configured to be received within said second notch.

6. The rotational coupling device of claim 5 wherein said first and second notches are diametrically opposite one another.

7. The rotational coupling device of claim 1 wherein said first axially projecting lug tapers in a direction extending away from said another of said hub and said first support member.

8. A rotational coupling device, comprising:
a rotor coupled to an input shaft for rotation therewith, said input shaft disposed about a rotational axis and said rotor having a hub defining a central bore into which said input shaft extends;
an armature disposed about said axis, said armature coupled to an output member and configured for selective engagement with said rotor; and,
a first support member disposed about said axis
wherein one of said hub and said first support member defines a first notch disposed in a first axial end face of said one of said hub and said first support member and another of said hub and said first support member defines a first axially projecting lug on a first axial end of said another of said hub and said first support member configured to be received within said first notch thereby rotatably coupling said first support member and said rotor
further comprising a second support member
wherein one of said hub and said second support member defines a second notch disposed in a second axial end face of said one of said hub and said second support member and another of said hub and said second support member defines a second axially projecting lug on a second axial end of said another of said hub and said second support member configured to be received within said second notch thereby rotatably coupling said second support member and said rotor.

9. A rotational coupling device, comprising:
a rotor coupled to an input shaft for rotation therewith, said input shaft disposed about a rotational axis and said rotor having a hub defining a central bore into which said input shaft extends;
an armature disposed about said axis, said armature coupled to an output member and configured for selective engagement with said rotor; and,
a first support member disposed about said axis
wherein one of said hub and said first support member defines a first notch disposed in a first axial end face of said one of said hub and said first support member and another of said hub and said first support member defines a first axially projecting lug on a first axial end of said another of said hub and said first support member configured to be received within said first notch thereby rotatably coupling said first support member and said rotor wherein said first support member defines a central bore, said input shaft extending into said central bore of said first support member.

10. The rotational coupling device of claim 9 wherein said first support member defines a radially inwardly extending key configured to be received within a keyway in said input shaft.

11. A rotational coupling device, comprising:
a rotor coupled to an input shaft for rotation therewith, said input shaft disposed about a rotational axis and said rotor having a hub defining a central bore into which said input shaft extends;
a field shell disposed about said input shaft and fixed against rotation;
an electrical conductor disposed within said field shell on a first side of said rotor;
an armature disposed about said axis on a second side of said rotor opposite said conductor, said armature coupled to an output member and configured for selective engagement with said rotor; and,
a first support member disposed about said axis
wherein at least one of said hub and said first support member defines one of a key and a keyway in a radially inner surface configured for engagement with the other of said key and said keyway in a radially outer surface of said input shaft and one of said hub and said first support member defines a first notch disposed in a first axial end face of said one of said hub and said first support member and another of said hub and said first support member defines a first axially projecting lug on a first axial end of said another of said hub and said first support member configured to be received within said first notch thereby rotatably coupling said first support member and said rotor, said first notch and said first lug located further radially from said axis than said key and said keyway.

12. The rotational coupling device of claim 11 wherein said first support member comprises a spacer, said spacer fastened to said input shaft.

13. The rotational coupling device of claim 11 wherein said first support member comprises a hub, said hub supporting a pulley.

14. The rotational coupling device of claim 11 wherein a radially outer surface of said first support member supports a bearing.

15. The rotational coupling device of claim 11 wherein said one of said hub and said first support member defines a second notch disposed in said first axial end face of said one of said hub and said first support member and said another of said hub and said first support member has a second axially projecting lug on said first axial end of said another of said hub and said first support member, said second axially projecting lug configured to be received within said second notch.

16. The rotational coupling device of claim 15 wherein said first and second notches are diametrically opposite one another.

17. The rotational coupling device of claim 11 wherein said first axially projecting lug tapers in a direction extending away from said another of said hub and said first support member.

18. A rotational coupling device, comprising:
a rotor coupled to an input shaft for rotation therewith, said input shaft disposed about a rotational axis and said rotor having a hub defining a central bore into which said input shaft extends;
a field shell disposed about said input shaft and fixed against rotation;
an electrical conductor disposed within said field shell on a first side of said rotor;
an armature disposed about said axis on a second side of said rotor opposite said conductor, said armature coupled to an output member and configured for selective engagement with said rotor; and,
a first support member disposed about said axis
wherein one of said hub and said first support member defines a first notch disposed in a first axial end face of said one of said hub and said first support member and another of said hub and said first support member defines a first axially projecting lug on a first axial end of said another of said hub and said first support member configured to be received within said first notch thereby rotatably coupling said first support member and said rotor
further comprising a second support member
wherein one of said hub and said second support member defines a second notch disposed in a second axial end face of said one of said hub and said second support member and another of said hub and said second support member defines a second axially projecting lug on a second axial end of said another of said hub and said second support member configured to be received within said second notch thereby rotatably coupling said second support member and said rotor.

19. A rotational coupling device, comprising:
a rotor coupled to an input shaft for rotation therewith, said input shaft disposed about a rotational axis and said rotor having a hub defining a central bore into which said input shaft extends;
a field shell disposed about said input shaft and fixed against rotation;
an electrical conductor disposed within said field shell on a first side of said rotor;
an armature disposed about said axis on a second side of said rotor opposite said conductor, said armature coupled to an output member and configured for selective engagement with said rotor; and,
a first support member disposed about said axis
wherein one of said hub and said first support member defines a first notch disposed in a first axial end face of said one of said hub and said first support member and another of said hub and said first support member defines a first axially projecting lug on a first axial end of said another of said hub and said first support member configured to be received within said first notch thereby rotatably coupling said first support member and said rotor
wherein said first support member defines a central bore, said input shaft extending into said central bore of said first support member.

20. The rotational coupling device of claim 19 wherein said first support member defines a radially inwardly extending key configured to be received within a keyway in said input shaft.

* * * * *